June 19, 1956     C. THOMSON     2,751,065
CABLE DRIVEN CONVEYORS
Filed June 19, 1952     11 Sheets-Sheet 1
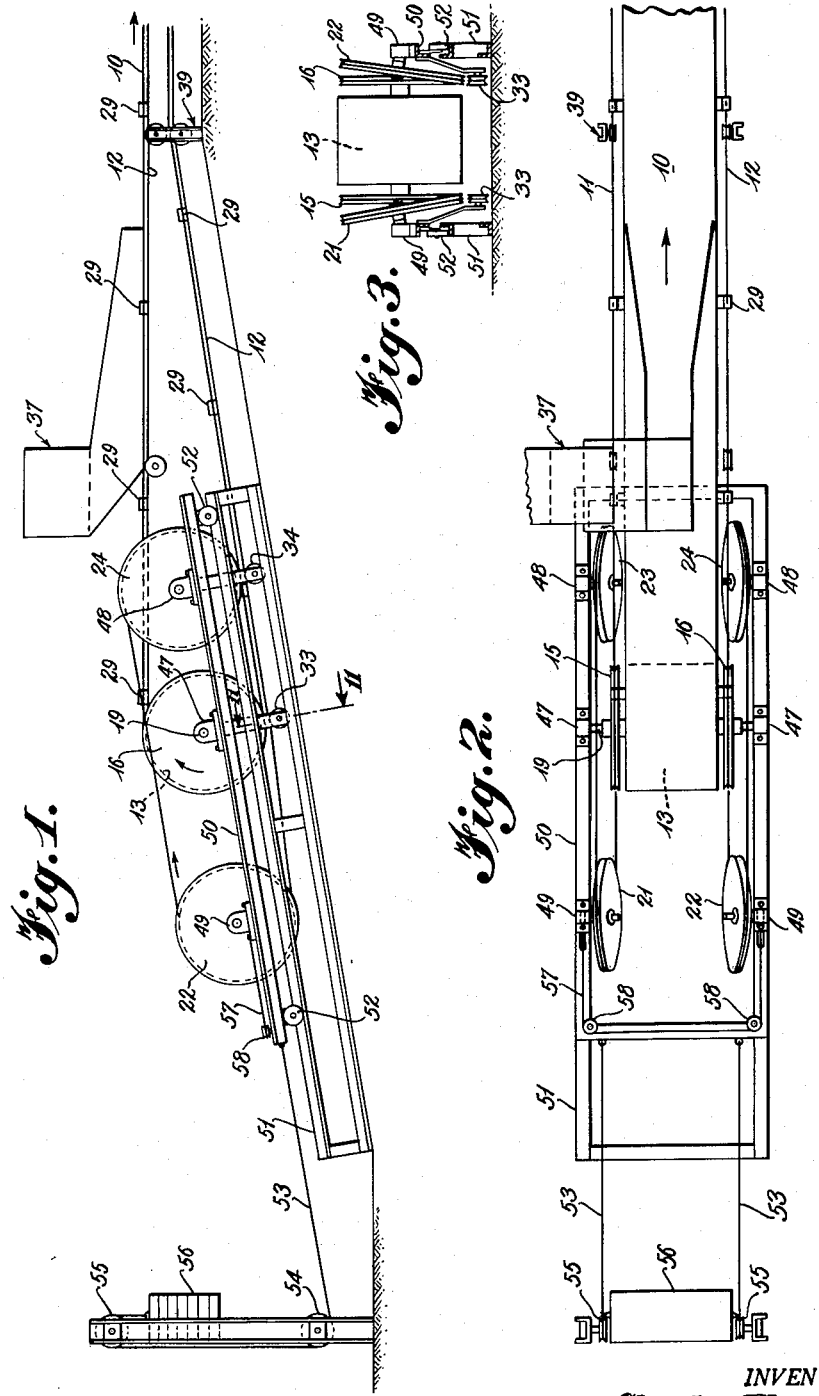
INVENTOR.
*Charles Thomson*
BY
*Stevens, Davis, Miller & Mosher*
ATTORNEYS

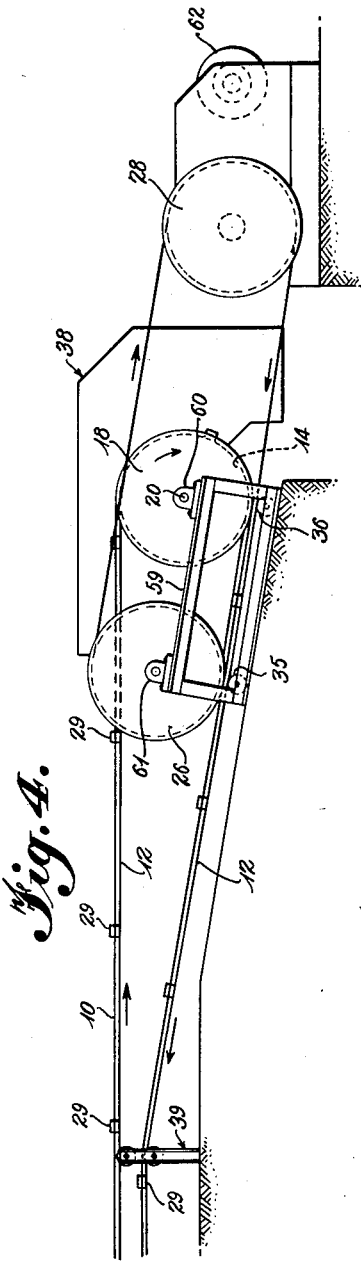

June 19, 1956  C. THOMSON  2,751,065
CABLE DRIVEN CONVEYORS
Filed June 19, 1952  11 Sheets-Sheet 3
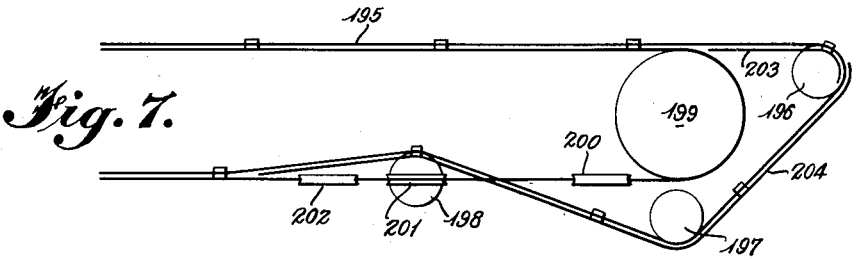
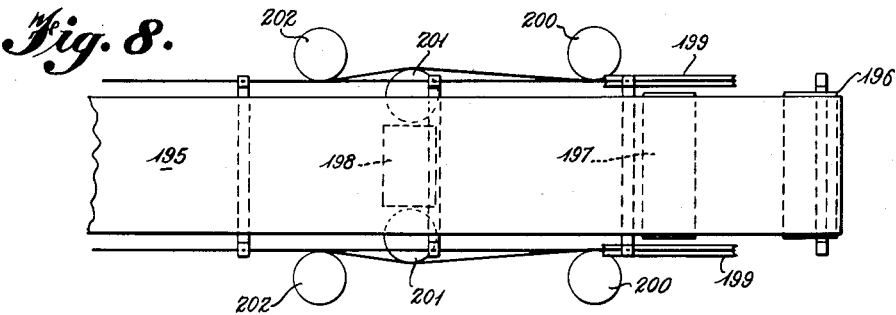
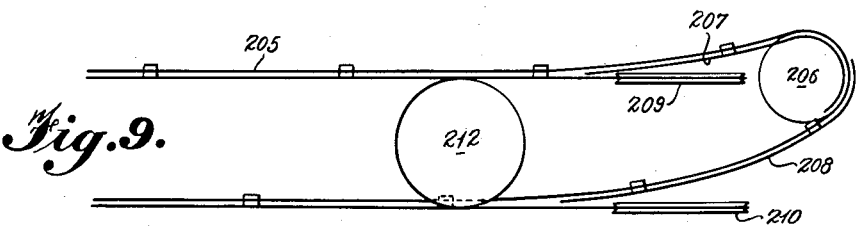
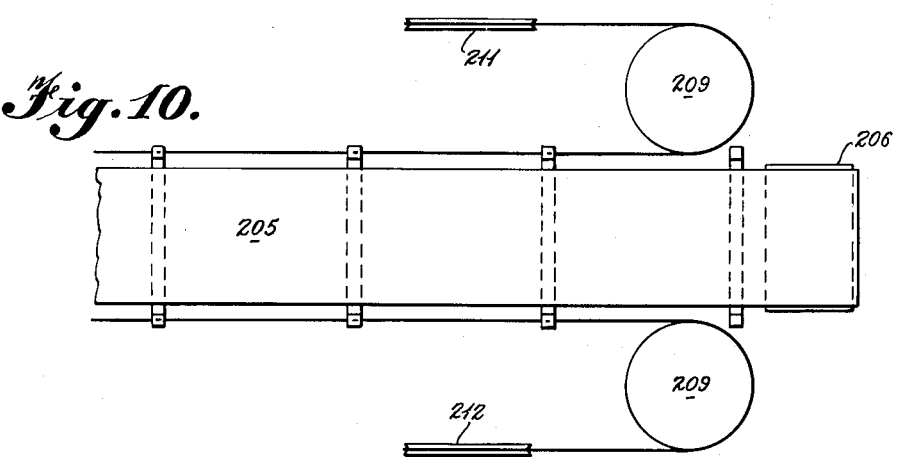
INVENTOR.
*Charles Thomson*
BY
*Stevens, Davis, Miller & Mosher*
ATTORNEYS

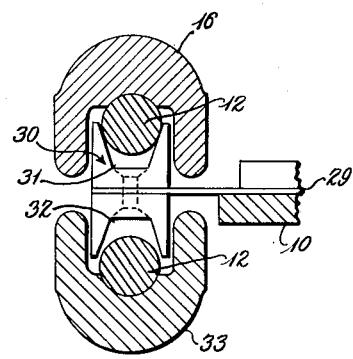
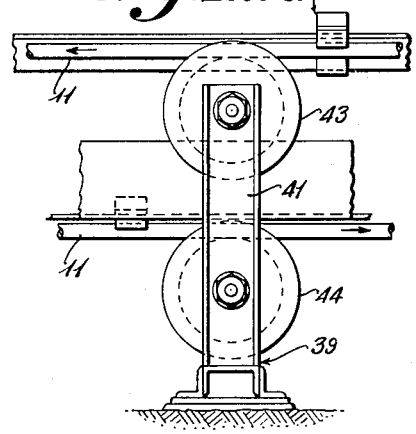
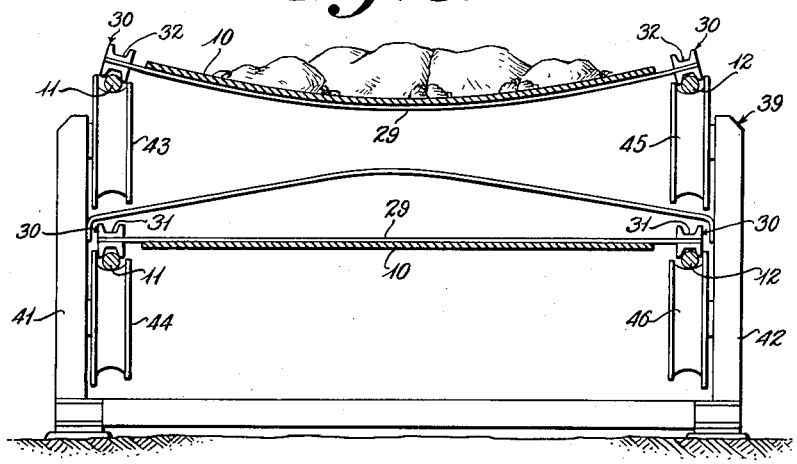
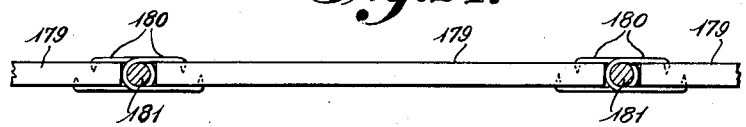
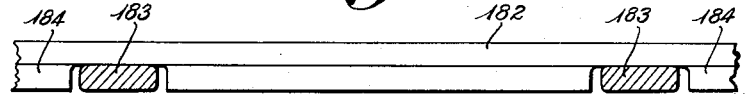

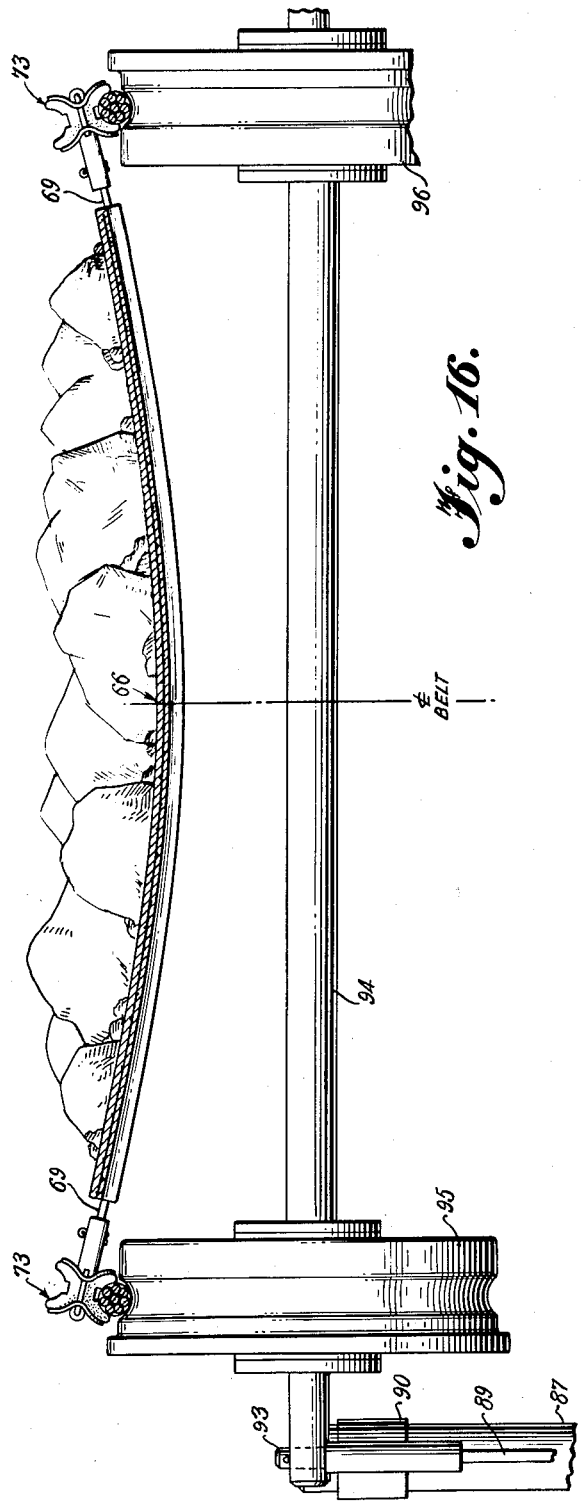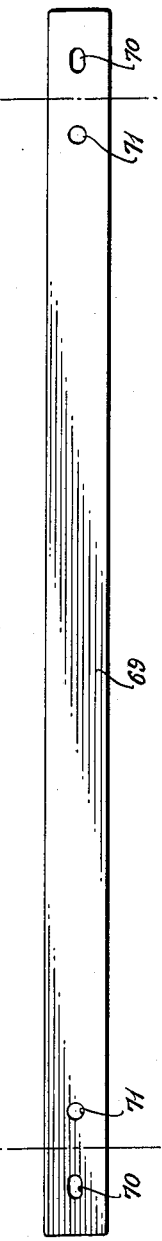

June 19, 1956  C. THOMSON  2,751,065
CABLE DRIVEN CONVEYORS
Filed June 19, 1952  11 Sheets-Sheet 6
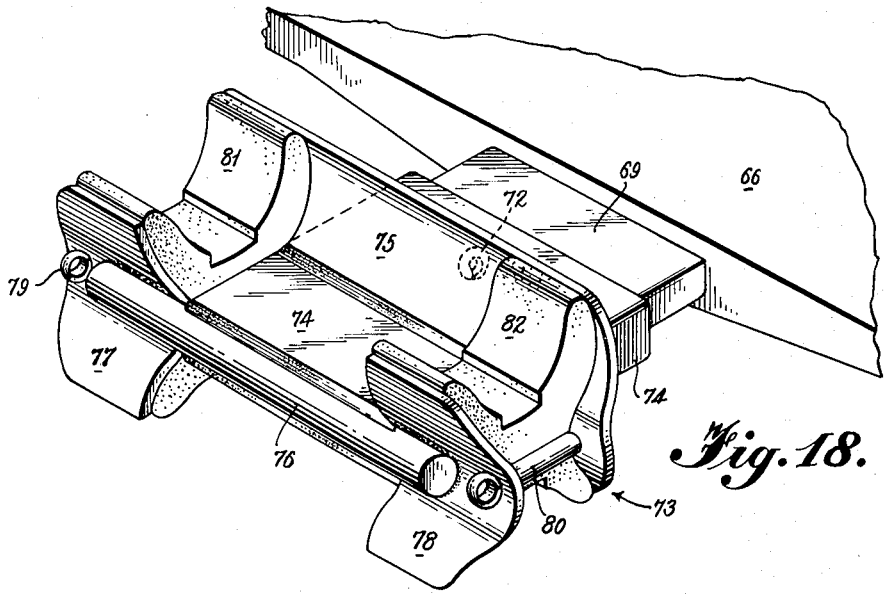
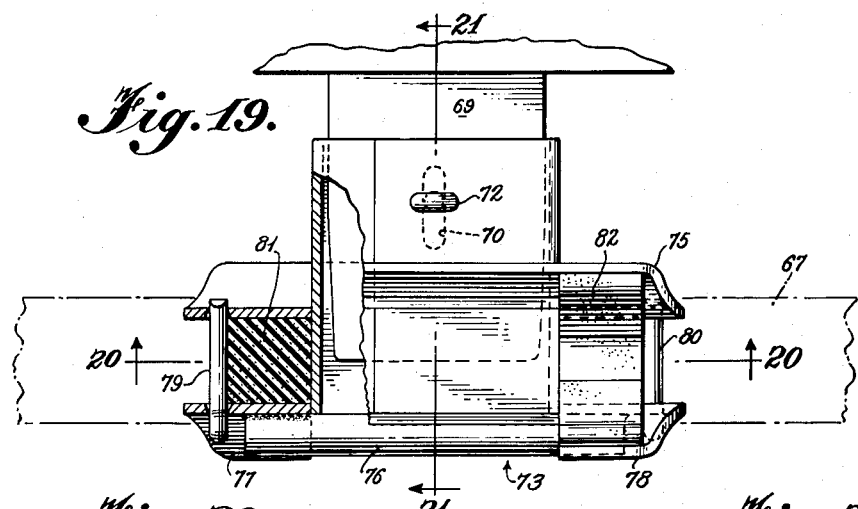
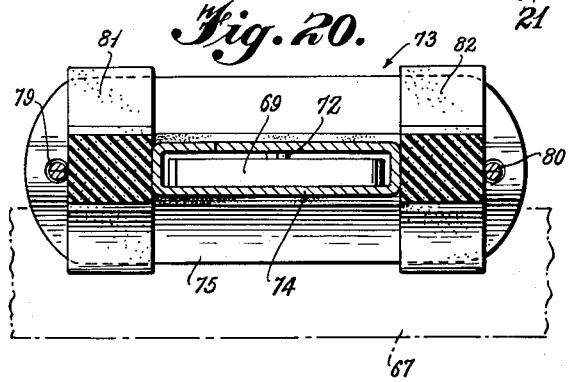
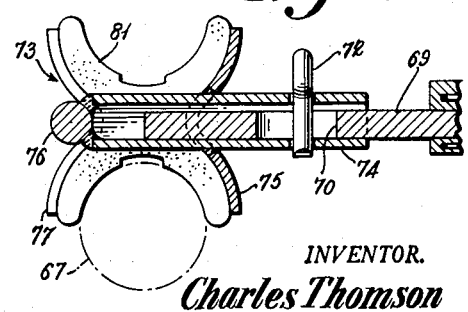
INVENTOR.
Charles Thomson
BY
Stevens, Davis, Miller & Mosher
ATTORNEYS

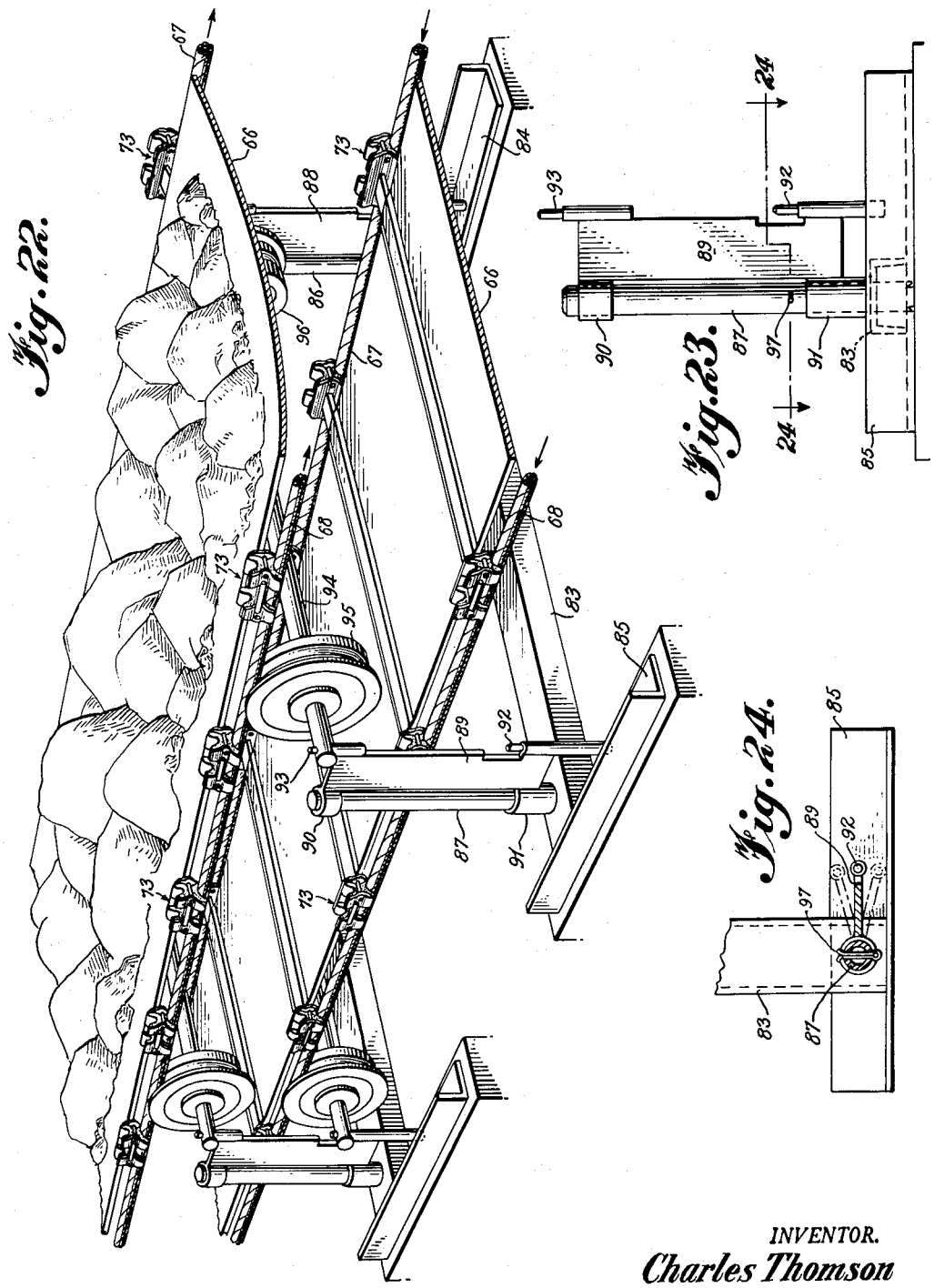

June 19, 1956  C. THOMSON  2,751,065
CABLE DRIVEN CONVEYORS
Filed June 19, 1952  11 Sheets-Sheet 8
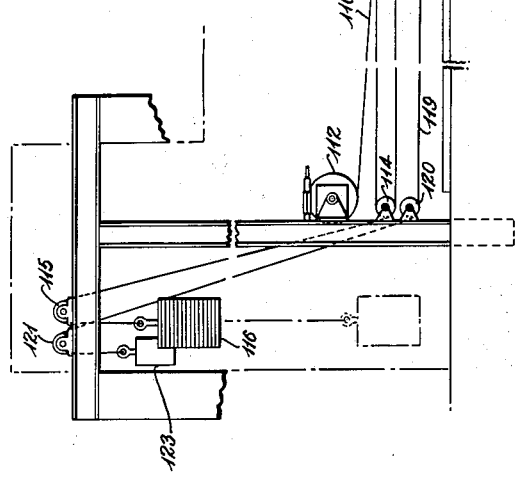
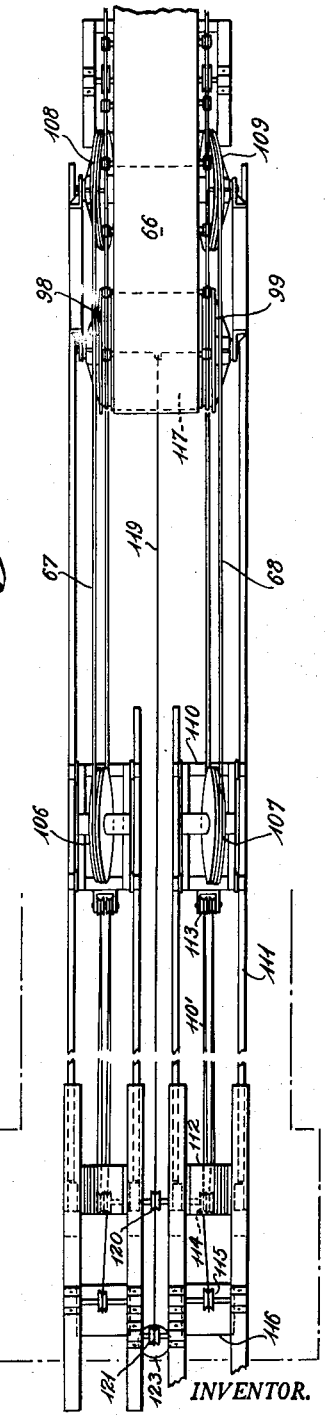
INVENTOR.
Charles Thomson
BY
Stevens, Davis, Miller & Mosher
ATTORNEYS June 19, 1956
C. THOMSON
2,751,065
CABLE DRIVEN CONVEYORS
Filed June 19, 1952
11 Sheets-Sheet 9
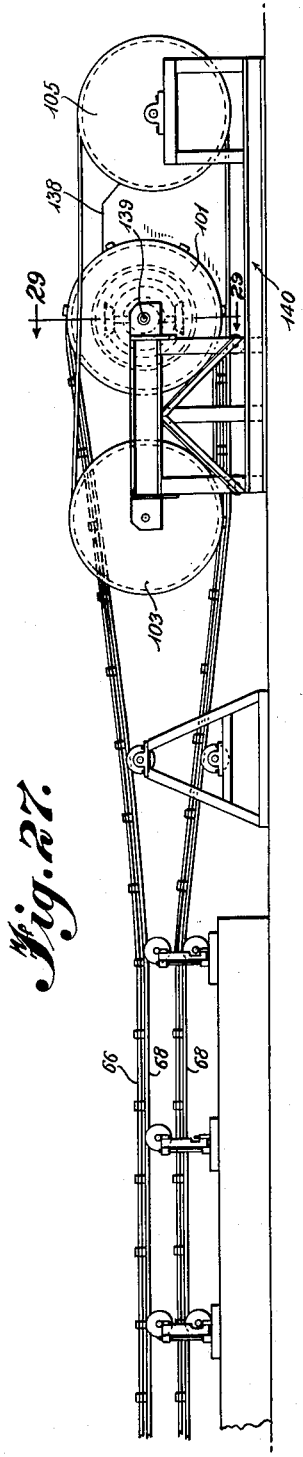
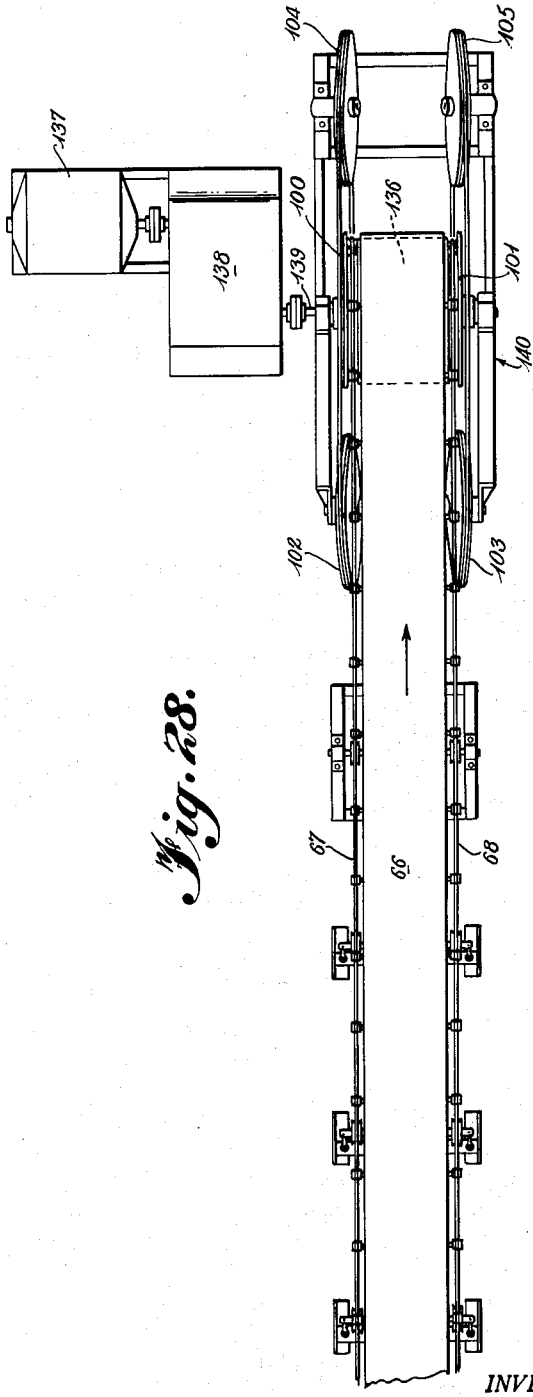
INVENTOR.
Charles Thomson
BY
Stevens, Davis, Miller & Mosher
ATTORNEYS June 19, 1956
C. THOMSON
2,751,065
CABLE DRIVEN CONVEYORS
Filed June 19, 1952
11 Sheets—Sheet 10
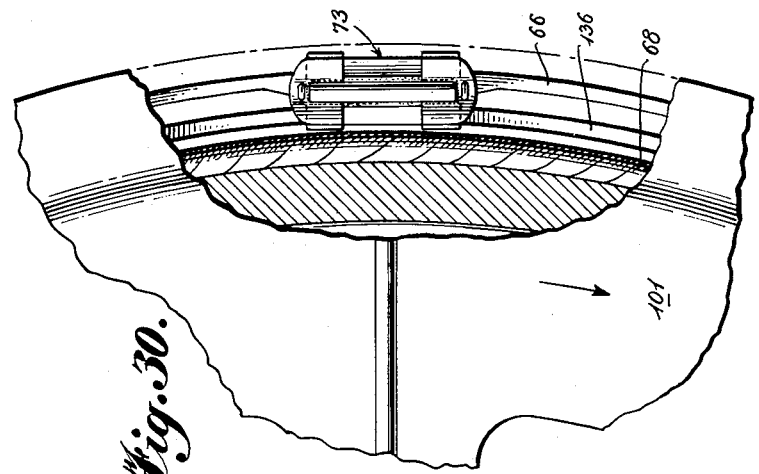
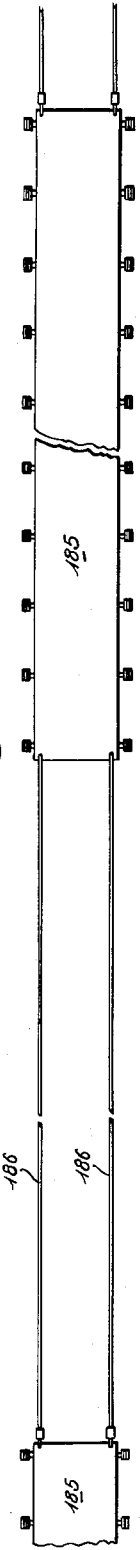
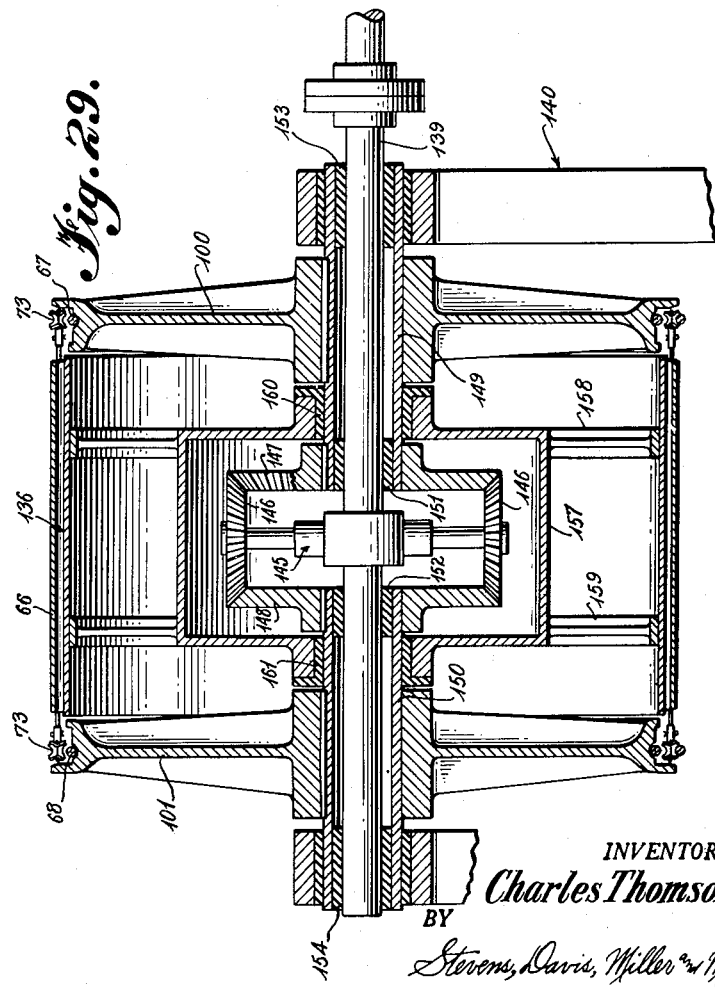
INVENTOR.
*Charles Thomson*
BY
*Stevens, Davis, Miller & Mosher*
ATTORNEYS June 19, 1956  C. THOMSON  2,751,065
CABLE DRIVEN CONVEYORS
Filed June 19, 1952  11 Sheets-Sheet 11
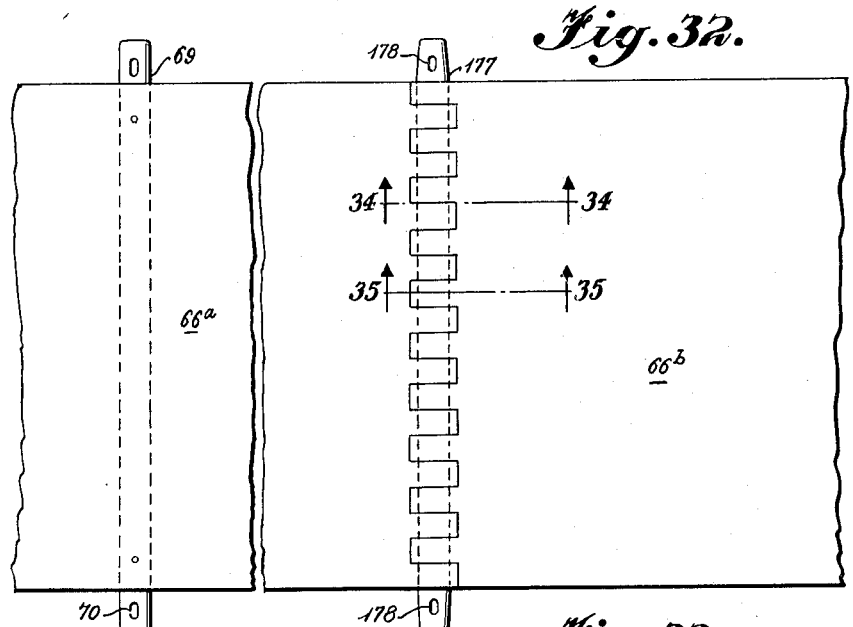
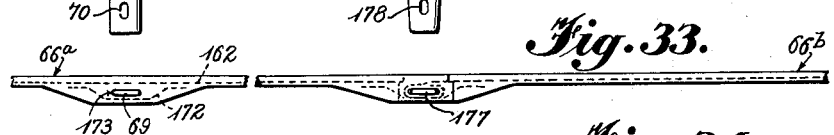
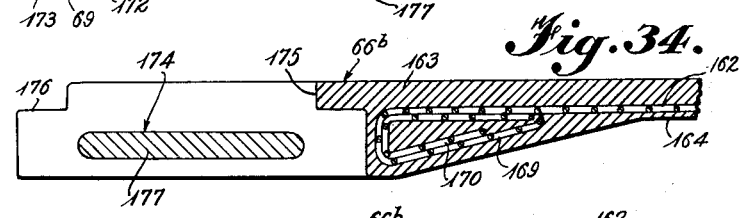
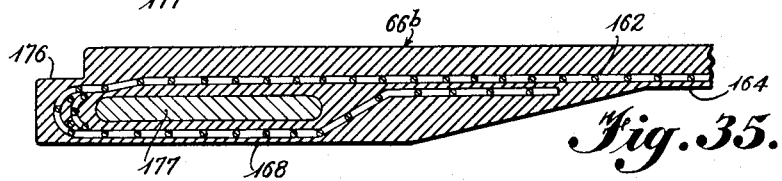
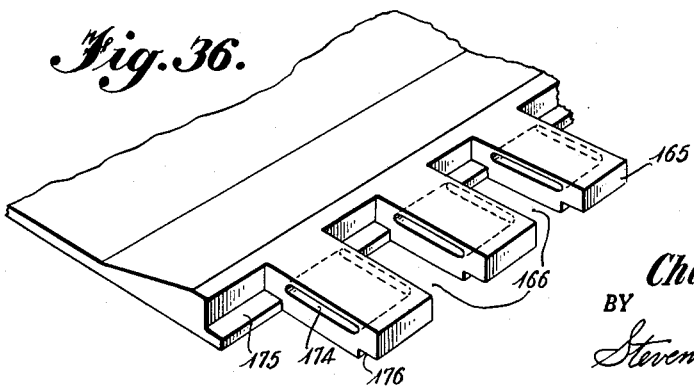
INVENTOR.
*Charles Thomson*
BY
*Stevens, Davis, Miller & Mosher*
ATTORNEYS United States Patent Office 2,751,065
Patented June 19, 1956

2,751,065

CABLE DRIVEN CONVEYORS

Charles Thomson, Inverness, Scotland, assignor to Cable Belt Limited, Inverness, Scotland Application June 19, 1952, Serial No. 294,373

Claims priority, application Great Britain October 8, 1947

10 Claims. (Cl. 198—191)

This application relates to conveyors and is a continuation-in-part of application Serial Number 143,069, and now abandoned, filed February 8, 1950, and application Serial Number 274,697, and now abandoned, filed March 4, 1952.

In the conveyor art, it has long been appreciated that the high cost factor militates against the more common use of belt conveyors of great length or high lift, such cost resulting from the need, under such conditions of high tension operation, for extremely heavy or specially reinforced belts; also that one approach to the solution of this cost problem centers around the idea of in some way coupling a conveyor belt to one or more cables and using the latter as the drive components, whereby the belt itself need only be of sufficient strength to sustain the weight of the material to be transported and, hence, can be of light, inexpensive construction. The invention of this application and its predecessors relates to conveyors of this cable-drive type.

As in any belt type conveyor for handling loose material, the belt is required to be troughed to avoid spillage; and one of the problems encountered in this present type of conveyor has been the effective control of the troughing and, related thereto, the manner of supporting the belt from the cables and the maintenance of appropriate cable spacing under different or varying load conditions. Problems have also been encountered relative to the handling of the belt and the cables at the head and tail ends of the conveyor particularly where, as in the preferred forms of the invention to be described, the return runs of the cables serve also to support the return run of the belt, with the result that the belt-cable couplings are required to be such as to accommodate themselves to the reversals of the belt at the head and tail ends of the system.

It is the primary object of this invention to overcome the foregoing difficulties and to provide a simple and reliable cable driven conveyor especially adapted for long distance or high lift usage, with considerable economy as compared with standard belt-conveyor construction.

In general, the conveyor of the invention contemplates the use of a belt having suitably attached to it at intervals throughout its length, cross members which engage the belt throughout its width and serve to permit and, at the same time control, the troughing of the belt under load. As will presently be apparent, these cross members are designed and function as flexible, resilient beams which, on the one hand, permit the requisite troughing of the belt under load and, on the other hand, themselves limit the degree of troughing, so that the loaded belt is stabilized against any tendency of its center to sag and its edges to draw inwardly except to the limited extent determined by the beam members.

Another aspect of the invention is concerned with the supporting of such a belt on or from a pair of drive cables. Obviously, any troughing of the belt results in some inward movement of the belt edges; but it has been found that the belt of this invention carries its load so smoothly that spillage of material can be safely avoided with substantially less troughing than is required for a standard, idler-supported belt. By way of comparison, for example, it may be mentioned that whereas a standard 36 inch conveyor belt designed for support by troughing idlers might be required to trough some 4 inches, a conveyor of like width and even greater capacity but embodying the present invention need be designed to trough only 2.8 inches. This factor not only permits the use of stiffer and, hence, less sensitive beam members but also minimizes the inward movement of the belt edges and enables it to be readily compensated for or accommodated in a variety of ways, as hereinafter exemplified.

In the preferred form of the invention, the troughing control members take the form of flat, spring steel straps, which project beyond the belt edges and provide convenient mountings for the belt-cable couplings, the latter taking the form of heads or shoe members which are grooved or notched and simply rest or seat on the suitably spaced drive cables (which parallel the belt edges) and thereby freely suspend the belt and its load. In other words, at least throughout the upper or load carrying run and preferably also throughout the return run, the cables serve as the sole support for the belt.

Novel provision is also made for handling the cables and belt at the head and tail ends of the system to effect the transfer of the shoe support of the belt from the upper to the lower run of each cable, and vice versa.

Other objects and advantages of the invention will be apparent from the following detail description of the several embodiments illustrated in the accompanying drawings, of which:

Figure 1 is a schematic view in side elevation of the tail or load receiving end of a conveyor constructed according to the teachings of the present invention;

Figure 2 is a top plan view of the load receiving end depicted in Figure 1;

Figure 3 is a view in end elevation, partially in section, of the load receiving end depicted in Figure 1;

Figure 4 is a schematic view in side elevation of the head or load discharging end of the conveyor of Figure 1;

Figure 5 is a top plan view of the load discharging end depicted in Figure 4;

Figure 6 is a view in side elevation of a modified cable and belt reversing arrangement according to the present invention;

Figure 7 is a view in side elevation of another modified cable and belt reversing arrangement;

Figure 8 is a top plan view of the arrangement of Figure 7;

Figure 9 is a view in side elevation of still another cable and belt reversing arrangement;

Figure 10 is a top plan view of the arrangement of Figure 9;

Figure 11 is a fragmentary view in section on the line 11—11 of Figure 1;

Figure 12 is a side view of a line sheave stand;

Figure 13 is a transverse view of cables and belt of the conveyor system taken at the plane of a line sheave stand;

Figure 14 is a fragmentary view partially in longitudinal section of one form of belt according to the present invention;

Figure 15 is a view similar to Figure 13 showing another form of belt;

Figure 16 is a transverse sectional view of the top run of a conveyor incorporating modifications;

Figure 17 is a plan view of a cross strap appropriate for the Figure 16 form of the invention;

Figure 18 is a perspective view to an enlarged scale of one of the shoes of Figure 16;

Figure 19 is a top plan, partially sectioned view of the same shoe;

Figure 20 is a section on the line 20—20 of Figure 19;

Figure 21 is a section on the line 21—21 of Figure 19;

Figure 22 is a perspective view of the conveyor of Figure 16 showing portions of both runs and the cable supports;

Figure 23 is a detailed view in side elevation of one side of a line stand;

Figure 24 is a section on the line 24—24 of Figure 23;

Figure 25 is a side elevation of the tail or load receiving end of another conveyor constructed according to the teachings of the present invention and embodying differences in the cable and belt tensioning mechanism;

Figure 26 is a top plan view of the conveyor of Figure 25;

Figure 27 is a view in side elevation of the head or load discharging end of the conveyor of Figure 25;

Figure 28 is a top plan view of the conveyor of Figure 27;

Figure 29 is an enlarged central section view on the line 29—29 of the belt drum of Figure 27 showing the details of the cable drive mechanism;

Figure 30 is a fragmentary view showing the lifting of the shoes from the driving cables during belt and cable reversing;

Figure 31 is a plan view of an interrupted form of belt;

Figure 32 is a plan view of a conveyor belt appropriate for the system and incorporating a preferred form of joint;

Figure 33 is a side view of the belt of Figure 32;

Figure 34 is an enlarged section on the line 34—34 of Figure 32;

Figure 35 is an enlarged section on the line 35—35 of Figure 32;

Figure 36 is a fragmentary perspective view of the underside of a belt section end prepared for joining with a complementary section.

Referring first to the arrangements illustrated in Figures 1–5, the belt means by which the load is transported may be assumed to consist of an endless band or conveyor belt 10 and it is arranged to be supported and driven by endless cables 11 and 12, which are spaced outwardly from and parallel the edges of the belt, to form two parallel cable circuits. At the tail end of this system (Figures 1 and 2), the belt passes around drum or pulley 13 and at the head end of the system (Figures 4 and 5), around drum or pulley 14.

The cable arrangements at the head and tail ends of the system, now to be described, comprise sets of sheaves, which in effect, transfer the cables from the upper to the lower run, and vice versa, in such fashion that in both runs, the cables are beneath and, hence, in supporting relation to the belt-cable couplings or shoes.

At the tail end of the system, cable sheaves 15 and 16 are mounted coaxially and on opposite sides of belt drum 13 and at the head end of the system, similar cable sheaves 17 and 18 are mounted coaxially and on opposite sides of belt drum 14. The belt drums and their respective sheaves are mounted for relative rotation about the axes of shafts 19 and 20 respectively.

Outer cable sheaves 21 and 22 are located beyond cable drum 13 and inner cable sheaves 23 and 24 are located on the opposite side of drum 13. Similarly, at the head end of the system, inner cable sheaves 25 and 26 and outer cable sheaves 27 and 28 are mounted in like relation to drum 14. In order to provide appropriate clearance, as will presently be apparent, sheaves 21, 22, 23, 24, 25 and 26 are skewed, so that their tops only are displaced outwardly with respect to the cable sheaves carried by shafts 19 and 20. For present purposes, it may be assumed that sheaves 27 and 28 drive the respective cables.

Tracing the path of cable 12 as it enters at the upper left in Figure 4, it will be seen that this cable passes directly to the top of sheave 18, from the bottom of that sheave to the bottom of sheave 26, from the top of sheave 26 to the top of sheave 28; and, from the bottom of sheave 28, it passes into the lower or return run, leaving the Figure 4 illustration at the extreme left. Then (reverting to Figures 1 and 2), it will be seen that this lower run of cable 12 passes directly to the bottom of sheave 22, from the top of sheave 22 to the top of sheave 24, from the bottom of sheave 24 to the bottom of sheave 16 and, from the top of sheave 16, back into the upper run. The path followed by cable 11 on the opposide side of the belt is identical and the description of it need not be repeated. It will be noted that at each end of the system, each cable forms a complete loop in the passage of the cables from one run to the other. As indicated, pairs of steady sheaves, 33, 34, 35 and 36, may be provided to guide the lower-most runs of the cables as they enter (Figure 1) and leave (Figure 4) the loop sections, in paths paralleling and directly beneath the adjacent stretches of the cables where they leave (Figure 1) and enter (Figure 4), the said loop sections.

As already indicated, the troughing of the belt is defined and controlled by transverse beam members or cross strap means, preferably projecting beyond the edges of the belt and carrying the couplings or shoe means which engage and support the belt on the cables. The general arrangement is illustrated in Figure 13 in which the reference numeral 29 is applied to the cross straps and reference numeral 30 designates generally the shoe means. The latter may consist of or comprise moulded elements of rubber or the like mounted on the ends of the cross straps 29 and incorporating oppositely disposed cable notches. In Fig. 13 and having regard to the upper run of the belt, the lower or downwardly opening notches are designated 31 and the upper or upwardly opening notches are designated 32.

From the foregoing description of the paths followed by the cables at the head and tail ends of the system, it will be readily understood that as the shoes of each cross strap reach the head end, they are disengaged from the cables and, being part of the belt assembly, immediately enter the lower or return run. The cables, on the other hand, traverse the aforementioned cable loop and then re-enter the system, beneath the shoes and in position to be reengaged by them for the return run. Throughout the return run, of course, the formerly idle shoe notches 32 are the ones engaged and supported by the cables, as illustrated in Figures 11 and 13. Figure 11 illustrates how each shoe is transferred from one stretch to the other of the looped cable and it will be noted that the upper and lower shoe notches are in guided relationship with respect to both cable stretches at the same time, with the result that the transfer is effected without danger of a shoe failing to engage.

In Figure 13, it will be noted that the lower or return run of the belt is shown as lying flat, which may be assumed to be its normal form when it and the cross straps are not subjected to the weight of a transported load. As will be understood, material deposited on the belt at a loading station (schematically indicated at 37 at Figure 1) causes the belt to assume its predetermined troughed form and when the load is discharged at the receiving station (schematically indicated at 38 at Figure 4), the belt is immediately restored to its flat or substantially flat form by the cross straps for passage around the cylindrical belt drum.

Not only are the shoes gravity-seated with resulting advantage by way of simplification of the drive coupling, but they are also arranged with their cable engaging notches below the plane of the strap which is a factor in stabilizing the system against undue variation in the spacing of the cables under operating conditions.

Coming now to this further feature of the invention, it will be noted (Fig. 13) that the shoe-strap construction is such that the cross strap ends are elevated above the axes of the cables. The result of this arrangement is that, when the cross straps are deflected under load applied to the belt, the inevitable movement of the strap ends towards one another does not bring about a like movement of the cables, even though the latter are straddled by the shoe notches. Because the shoe defines with the strap an angle which is maintained substantially constant under load, it is apparent that movement of the strap ends towards one another causes canting of the shoes which inevitably causes the repsective bottom grooves of the shoes to move away from one another. It is apparent that the cables feel only the algebraic sum of the movement of the strap ends toward one another and the movement of the bottom groove of the shoes away from one another. The height of the strap above the shoe can be so selected that at a given deflection the movement outward of the bottom groove of the shoe is equal to the inward movement of the strap ends towards one another. At intermediate deflections the outward movement of the bottom grooves of the shoe is greater than the inward movement of the ends of the straps towards one another, resulting in a tendency to move the cables outwards. The outward movement of the cables however is only approximately one fourth of the inward movement that would occur if no correction were applied by means of shoe height.

It will be understood that once the desirability of locating the cross straps above the cable axes is appreciated, the particular heights for various belt widths and degrees of sag are subject to calculation. It is deemed preferable to provide one or more separate or additional ways of offsetting or accommodating the system to the load-induced movement of the strap ends toward one another and several such additional ways are mentioned below.

The cables are supported throughout their upper and lower runs by line pulleys, the general assemblies of which are designated at 39 in Figures 1, 4, 12 and 13. A brief description of one will serve for all and, with reference to Figs 12 and 13, it will be noted that each of these assemblies consists of oppositely disposed standards 41 and 42 on the inner sides of which are journalled pairs of pulleys 43, 44 and 45, 46 respectively. It will be understood that the cable line pulleys can be widely spaced as compared with the spacing required of troughing idlers of a standard belt conveyor.

In Fig. 13, it will be noted that the line pulleys are shown as having wide faces or treads so that the cables are not confined against limited lateral movement. This feature will be recognized as affording another or supplementary way of accommodating load-induced shortening of the horizontal distance between belt edges and strap ends.

As in conveyor systems generally, suitable take-up means are provided; although, in this instance, they are required for the cables as well as for the belt, as is schematically illustrated in Fig. 1. As there indicated, shaft bearings 47, 48 and 49 are all mounted on a carriage 50, the wheels 52 of which run on track 51. Take-up cables 53 are shown as passing over pulleys 54, 55 and suspending a take-up or tension weight 56. As also indicated, the two cables 11 and 12 may be balanced by mounting bearings 49 with freedom to slide on carriage 50 and connecting them together by cable 57 passing around pulleys 58. As indicated in Figs. 1 and 3, the steady sheaves 33 and 34 may also be suspended from the carriage 50. At the head end of the system (Figs. 4 and 5), a framework 59 is indicated as supporting bearings 60 for shaft 20 and bearings 61 for the shafts of sheaves 25 and 26. The steady sheaves 35 and 36 are shown as mounted on the same framework 59.

The cable drive, schematically illustrated in Fig. 5, includes an electric motor 62 with reduction gearing and a differential, generally designated 63, coupled to shafts 64 and 65. The primary purpose of the differential is to take care of possible differences in drive sheave diameters.

Introducing the differential would seem to give rise to another problem in that the normal functioning of a differential interposed between and driving two wheels is such that the lighter loaded wheel tends to speed up and the heavier loaded to slow down. In the present instance, however, the belt, cross straps and shoes constitute what might be termed a coupling between the two cables; and, provided the belt has sufficient rigidity, this coupling serves to prevent the cables running at different speeds. Instead, the belt transmits part of the drag of the heavier loaded cable to the lighter loaded and so equalizes the load between them. It has been found that a conveyor belt, even a light weight rubber-canvas belt of the kind herein contemplated, does have sufficient rigidity to function as described.

The principles of the foregoing embodiment of the invention are exemplified in modified form in Figs. 16–24 inclusive in which the belt is marked 66, the drive cables 67 and 68, the cross straps 69 and the shoe means 73. The typical cross strap 69 shown in Fig. 17 is provided adjacent its ends with slots 70 for a purpose to be described and, inwardly of the slots, with holes 71 by means of which the strap may be interlocked with the belt. For example, rubber blocks may be inserted in the holes 71 and vulcanized to the rubber of the belt.

The construction of this particular form of shoe means is illustrated in detail in Figs. 18–21 inclusive, from which it will be seen to comprise a metal frame designed for convenient mounting on the strap end and also to carry appropriate shoe blocks of moulded rubber or the like for engagement with the cables. The shoe frames consist of an inner plate 75 and longitudinally spaced outer plates 77 and 78, the latter being united by rod 76 welded to them. The inner shoes plate is slotted to receive a flat tube member 74 which may be welded to the inner shoe plate and to bar 76 (see Fig. 21) and which is designed to telescope over and slide on the end of the cross strap 69. A split pin 72 passed through holes in the tubular member 74 and one of the end slots 70 of the cross strap serves to limit the permissible sliding of the shoe member in relation to the cross strap. At the opposite ends of the shoe frame and between the side members, shoe blocks 81 and 82 of rubber or the like are inserted and may be locked in place, as by split pins 79 and 80 (Figs. 18 and 19). As in the form already described, the shoe blocks have upper and lower notches designed to seat on the cables. By spacing the shoe blocks and outer shoe plates, an escape passage is provided for material which might otherwise tend to accumulate on the shoes and interfere with their seating on the cables.

The foregoing or any other convenient method of mounting the shoe means on the cross straps for limited sliding movement will be recognized as affording another way of offsetting or accommodating the load-induced shortening of the horizontal distance between the belt edges and strap ends. While not essential, some such provision for sliding movement of the shoe means is desirable in that it affords one way of minimizing the need for accurate spacing of the cable line pulleys and is deemed preferable to the equivalent alternative of mounting the pulleys themselves with freedom for limited axial movement.

It will be understood that there is nothing critical about the pitch or longitudinal spacing of the cross straps and the precise degree of sag or troughing of these straps, since these factors are determined by a composite of engineering and economic considerations. As a reasonable compromise of these various considerations, it has been found to be appropriate to space the cross straps with their centers a distance apart somewhat less than the width of the belt or, say, approximately equal to the width of the bed of material to be carried on the belt. From some such starting point, it is a simple matter to determine the form of the strap required to carry any particular load with sufficient sag to avoid spillage. By way of example only, it may be noted that for a medium duty conveyor utilizing a 36" belt, spring steel cross straps of the general form illustrated may appropriately be of the order of 42" long, 2" wide and ¼" thick. Similarly, for a 48" belt, the straps may be, say, 56" long, 3" wide and 5/16" thick.

As in the form of the invention previously described, it will be noted that the ends of the cross straps are located above the cable centers and that the shoes are free to rock on the cables in response to troughing. Thus, in this present form of the invention, the load-induced shortening of the horizontal distance between the belt edges and strap ends is similarly offset or accommodated by two complementary provisions, namely, by the elevation of the straps above the cable axes, with its resulting shoe-tilting, and by the sliding connection between the shoe frames and the strap ends. As will now be apparent, these several offsetting or accommodating arrangements already described can be severally or jointly applied in various ways, all with the net effect of maintaining, throughout the entire runs of the cables, a uniform spacing of the cable centers and thereby avoiding excessive flange wear of the cable line pulleys and of the cables themselves.

Referring now to Figs. 22, 23 and 24, it will be seen that the conveyor is supported on structural frame members 83, 84 and 85 from which project vertical standards 86 and 87. Taking standard 87 as illustrative, it will be noted that the line pulley support assembly includes a plate 89 carrying short pipe sections 90 and 91 telescoped over and free to rotate about the standard 87 and carrying also upstanding pins 92 and 93. A similar plate 88 is mounted to swing about standard 86 on the opposite side of the conveyor. The pins 92 and 93 and their opposite counterparts serve as supports for the line pulley shafts, such as shaft 94 for line pulleys 95 and 96 in Figs. 16 and 22. As will be noted, the shaft ends are simply drilled and seated over the upstanding pins. By this means, each pair of opposite pulleys is mounted on a parallel motion linkage and is capable of horizontal movement transversely of the conveyor, all the pulleys being thus rendered self-aligning. The line pulleys for the lower or return run of the cables can be more widely spaced than for the upper or load carrying run and, as indicated in Fig. 22, can simply be omitted at intervals.

Figs. 25–29 inclusive, which will now be described, illustrate alternative take-up and drive arrangements to those of Figs. 1–5.

The loop arrangement of the cables at each end of the system is generally the same as that already described with reference to Figs. 1–5 inclusive. As will be seen, cables 67 and 68 pass around end sheaves 100 and 101, and pairs of inner and outer skew sheaves 102, 103 and 104, 105, respectively, at the head end of the system (Figs. 27 and 28), and around end sheaves 98 and 99 and pairs of outer and inner skew sheaves 106, 107 and 108, 109, respectively, at the tail end of the system (Figs. 25 and 26). The shoe transfer operation is thus the same as already described.

In this instance, however, as is preferred, an individual take-up is provided for each cable and for the belt 66. To this end, the shaft of skew sheave 107 is mounted on a wheeled carriage 110 running on track 111. A take-up cable 110' attached at one end to a cable storage winch 112, is reeved around pulleys 113, 114 and 115 and suspends a take-up weight 116. An identical carriage, winch, cable arrangement and take-up weight is provided for skew sheave 106.

Belt drum 117, cable sheaves 98 and 99 and skew sheaves 108 and 109 are likewise mounted on a wheeled, track-supported carriage 118, to which is attached a take-up cable 119 passing around pulleys 120 and 121 and suspending a belt take-up weight 123. The carriage 118 can move along its tracks without affecting the tension on the cables 67 and 68 which form loops respectively about the sheaves 98, 108 and 99, 109.

In this form of the invention, the head drive is not applied to the outer sheaves 104 and 105, as in the Figs. 4, 5 arrangement, but to the sheaves 100 and 101 mounted on each side of belt drum 136. As before, the drive may include an electric motor 137 and reduction gearing 138 coupled, in this instance, to shaft 139. As indicated in Figs. 27 and 28, all of the head end cable sheaves and belt drum 136 are mounted on a suitable supporting structure generally designated 140.

As shown in detail in Fig. 29, the drive for cables 67 and 68 is applied to sheaves 100 and 101 through a differential mounted within belt drum 136. This drive comprises a spider 145 mounted on shaft 139 and carrying bevel gears 146, meshing with bevel gears 147, 148, which are keyed, respectively, to hollow shafts 149 and 150. The latter may be mounted at their outer and inner ends on bearing sleeves 151, 152, 153 and 154. Hollow shaft 149 is keyed to the hub of sheave 100 and hollow shaft 150 is keyed to the hub of sheave 101. The bevel gears of the differential are enclosed in a housing 157 which, by suitable supports 158 and 159, carries the belt drum 136, the hub of housing 157 being mounted on bushings 160 and 161. As will be recognized, this type of drive is extremely compact and is well protected.

In order to avoid rubbing between the shoes and cables during the passage of cables and belt about the axis of shaft 139, it is desirable to establish and maintain some clearance between the shoes and cables at that time. As illustrated in Fig. 30, this is readily accomplished by making the sheaves and drum of appropriately different diameters. Specifically the sheave diameter is reduced beyond the extent necessary to accommodate the height of the strap axes above the cable axes. Like provision for disengaging the shoes and cables is made at the tail end of the system.

In copending application, Serial No. 113,095, filed August 30, 1949, there is disclosed a belt suitable for use in the systems herein described, such belt having the cross straps embedded in it. Since such a belt, or any other suitable for the present system, is not subjected to driving tension, all of which is taken by the cables, it becomes feasible and convenient, both for assembly and replacement purposes, to make up the belt in relatively short lengths. In Figs. 32–36, is illustrated a convenient method of uniting the ends of such lengths by means of a cross strap similar in design and troughing function to those already described.

As schematically illustrated in Fig. 33, these belt lengths may consist of a reenforcing layer of canvas, or the like, sandwiched between upper and lower layers of rubber. As indicated at the left hand end of belt section 66(a) in Fig. 33, an auxiliary piece of reenforcing material 172 encircles a slot 173 designed to receive cross strap 69.

For the purposes of the illustrated form of belt joint, each end of each belt section is moulded, as in Fig. 36, with alternating fingers or projections 165 and intervening spaces 166, the fingers and spaces being of equal number, so that there is a finger at one edge of a belt section and a space at the opposite edge of that section. At the remote end of such a section, the arrangement is reversed, side for side. The sections are all identical and, hence, it will be seen that the fingers and spaces will interfit with the fingers and spaces of an adjacent section, regardless of which ends of the two sections are brought together. In general, it will be seen that the fingers are all moulded with slots 174, so that when interfitted with an adjacent section, the two sections can be united by inserting a cross strap, such as 177. To facilitate insertion, the ends of this cross strap may be slightly tapered as indicated. A snug joint is assured by moulding the fingers with recesses 176 and the roots of the intervening spaces with shoulders 175, the recesses of one belt end being engaged by the shoulders of the adjacent belt end.

For purposes of reenforcement, the canvas or like material is folded as indicated in Figs. 34 and 35. Before the belt is moulded, the ends of the canvas are cut and slit to form long and short fingers corresponding substantially in width to the width of the fingers 165 and intervening spaces 166. As shown in Fig. 34, the short canvas fingers (which are aligned with the spaces 166) are folded back upon themselves to form loops 169 and 170. The long canvas fingers, as shown in Fig. 35, are folded back upon themselves to form loops 168 which, in the finished belt, encircle the strap slots of the belt fingers 165.

In the modified form of belt joint illustrated in Fig. 14, lengths 179 of belt are shown united by talon type fastenings 180, with rod-like cross straps 181 interposed between the belt ends.

In the form illustrated in Fig. 15, a thicker belt 182, 184 is shown having recesses on its under side to receive cross straps 183.

It should be noted that the endless belt means for transporting the load need not have a continuous or uninterrupted load-supporting surface. For certain operations, where it is practical to utilize an intermittently operating feed of material to the conveyor, it may be more economical, from the standpoint of belt cost, to construct the belt means in the form of wide belt sections spaced from one another longitudinally of the conveyor and suitably coupled together to form an endless loop. By doubling the belt width, its carrying capacity is increased fourfold, so that for equal capacity, its over-all length need be but one fourth of that of a belt of one half its width. A portion of such an arrangement is diagrammed in Fig. 31, in which two such belt sections 185 are indicated, united by cables 186. It will be understood that each belt section is provided with cross straps and shoes and that the belt means is supported and driven by cables, just as described above. As will be understood, the feed of material to the belt is synchronized with the passage of the belt sections adjacent the feeding station.

Reverting to Figs. 6–10 inclusive, various other alternative arrangements are illustrated.

In the Fig. 6 arrangement, the cables serve to drive the belt, as in all the other forms, but to support it only on the upper or load-carrying run. In the upper run, the belt 187 is supported by cross straps 188 on cables 190, the latter supported, as above, on line sheaves 193. But in the lower run, the cables 191 are supported by sheaves 194 and the belt by idlers 192.

Figs. 7 and 8 illustrate an alternative arrangement for transferring the cables to the under side of the cross strap shoes at the head (or tail) end of the system. Belt 195 (equipped with cross straps and shoes as in the forms already described) is led around pulleys 196, 197 and 198. The cables, on the other hand, pass around sheaves 199, 200, 201 and 202. Guide rails 203, 204 may be provided for engagement by and support of the shoes on the ends of the belt cross straps while the shoes are out of engagement with the cables.

In the alternate transfer arrangement shown in Figs. 9 and 10, the belt passes around an elevated drum or pulley 206, while the cables are led off laterally around horizontally disposed sheaves 209, around sheaves 211, 212 and back into the lower run around horizontally disposed sheaves 210. Again it will be seen that the shoes are automatically disengaged from and re-engaged with the cables and, in both runs of the conveyor, are located above and supported by the cables.

In the light of the foregoing exemplification of the principles of the invention, the following is claimed.

I claim:

1. A conveyor comprising an endless flexible conveyor band, guide pulleys around which the said conveyor band passes at the ends of the conveyor, a pair of endless cables supported on sheaves to form a pair of parallel cable circuits, flexible cross members secured to said conveyor band for troughing therewith, shoes mounted on the ends of said cross members, a notch in each shoe to engage with one of said cables during one run of the conveyor to support the conveyor band from the cables during that run, a second notch in each shoe to engage with one of the cables during the other run of the conveyor and support the conveyor band from the cables during the said other run, and means forming loops in the cables at the ends of the conveyor run, which loops lead the cables out of engagement with the notches of one set and back into engagement with the notches of the other set.

2. A conveyor comprising an endless flexible conveyor band, guide pulleys around which the said conveyor band passes at the ends of the conveyor, a pair of endless cables supported on sheaves to form a pair of parallel cable circuits for troughing therewith, cross members secured to said conveyor band for troughing therewith, shoes mounted on the ends of said cross members, a notch in each shoe to engage with one of said cables during one run of the conveyor to support the conveyor band from the cables during that run, a second notch in each shoe to engage with one of the cables during the other run of the conveyor and support the conveyor band from the cables during the said other run, said notches being arranged back-to-back, and guide means around which the cables pass at the ends of the conveyor to form loops in the said cables, said guide means being so arranged that portions of each cable as it enters and leaves a loop are parallel to each other and are engaged simultaneously by the two notches on each shoe.

3. A conveyor comprising an endless flexible conveyor band, guide pulleys around which the said conveyor band passes at the ends of the conveyor, a pair of endless cables supported on sheaves to form a pair of parallel cable circuits, flexible cross members secured to said conveyor band for troughing therewith, shoes mounted on the ends of said cross members, a notch in each shoe to engage with one of said cables during one run of the conveyor to support the conveyor band from the cables during that run, a second notch in each shoe to engage with one of the cables during the other run of the conveyor and support the conveyor band from the cables during the said other run, said notches being arranged back-to-back, guide means for each cable comprising, at each end of each cable circuit, a main sheave and inner and outer additional sheaves located one on each side of the main sheave, at least one of the additional sheaves being mounted in a plane inclined to that of the said main sheave and the cable-engaging grooves of all three sheaves at their lower edges being in the plane of the main sheave, the cable passing round the main sheave and then round first the inner and then the outer additional sheave to form a loop the part of which between the main and inner additional sheaves is parallel to the part leaving the outer additional sheave, the said parallel parts being engaged simultaneously by the two notches on each shoe.

4. In a cable driven conveyor of the type including a belt and spaced cables which constitute the sole support for the belt and its load, the improvement which comprises troughing control means for the belt consisting of a plurality of flexible, resilient cross straps engaged with the belt throughout its width, the said cross straps each constituting a beam of such section as to deflect to predetermined trough form in response to load applied to the belt, the resilience of the beam serving to limit the extent of such troughing and means positionally controlled by said straps for engaging said cables and transmitting the load of the belt thereto.

5. A cable driven conveyor comprising a belt for carrying a load, cable means extending longitudinally of the belt adjacent the edges thereof, sheave means for said cables, fixed supports for said sheave means, longitudinally spaced, flexible, resilient cross straps arranged in supporting relation to the belt, said straps projecting beyond the belt edges on both sides, shoe means attached at each end of each cross strap, each shoe means having a cable groove in spaced relation to the strap to hold the strap ends above the cables, one of said means being free to shift laterally to accommodate the increase in distance between the edges of the belt and the fixed supports incident to belt troughing under load.

6. A conveyor system comprising belt means, cables for supporting and propelling the belt means, rotatable drums to reverse the direction of the belt at the ends of its runs, means including pairs of sheaves at each end of the system to reverse the direction of the cables at the ends of their runs, one pair of sheaves being coaxial with one of said drums, a differential within one of said drums having its bevel gears in driving relation to the sheaves of said one pair, and means to drive the differential box of said differential coaxially through one of the sheaves of said one pair.

7. A conveyor system comprising belt means for carrying a load, rotatable drums for reversing said belt means, spaced cables extending longitudinally of the belt means adjacent the edges thereof, means including sheaves coaxial with said drums to reverse the cables at the ends of their runs, flexible, resilient cross straps arranged in supporting relation to the belt means, a shoe attached at each side of each cross strap, each shoe having a cable groove therein disposed in spaced relation to the strap to hold the strap ends above the cables, the diameter of the sheaves that are coaxial with said drums being sufficiently smaller than the diameter of the drum to cause the shoes to disengage from the cables during reversal of the belt means.

8. A conveyor system comprising a belt, cables for supporting and propelling the belt, idler sheaves for supporting the cables at spaced points therealong, and means mounting said idler sheaves in pairs for free horizontal movement transversely of the conveyor.

9. A conveyor system comprising a belt, a pair of spaced cables for supporting and propelling said belt, axles, a pair of idler sheaves, mounted for free rotation on each of said axles and disposed a distance apart equal to the space between the cables of the pair, and means to support each sheave and axle unit for horizontal movement transversely of the conveyor, said means comprising a vertical standard on each side of the belt, a bracket mounted for pivotal movement on each standard, and vertical pivot means on said bracket supporting said axle.

10. A cable driven conveyor comprising belt means for carrying a load, spaced cables extending longitudinally of the belt means adjacent the edges thereof, longitudinally spaced, flexible, resilient cross straps arranged in supporting relation to the belt means, cable engaging means arranged in supporting relation to said resilient cross straps and having cable grooves freely seating on the cables, said cable grooves lying in spaced relation to said cross straps to hold the strap ends above the cables, the said cross straps each constituting a beam of such section as to deflect to predetermined troughed form in response to load applied to the belt, the resilience of the beam serving to limit the extent of such troughing.

References Cited in the file of this patent

UNITED STATES PATENTS

| 781,138   | Etcheverry    | Jan. 31, 1905 |
| 826,312   | Catlin        | July 17, 1906 |
| 1,750,425 | Parker        | Mar. 11, 1930 |
| 1,970,842 | Crossen       | Aug. 21, 1934 |
| 2,488,872 | Mathieu       | Nov. 22, 1949 |
| 2,489,440 | Vallance      | Nov. 29, 1949 |
| 2,656,035 | Thomson et al.| Oct. 20, 1953 |

FOREIGN PATENTS

| 226,080 | Germany | Sept. 26, 1910 |